United States Patent [19]

Israel

[11] Patent Number: 4,528,658

[45] Date of Patent: Jul. 9, 1985

[54] TELECOMMUNICATION SYSTEM WITH A MULTIPLICITY OF MODULAR UNITS INTERCHANGING DIGITAL MESSAGES

[75] Inventor: John W. Israel, Dallas, Tex.

[73] Assignee: Italtel-Societa Italiana Telecomunicazioni S.p.A., Milan, Italy

[21] Appl. No.: 417,371

[22] Filed: Sep. 13, 1982

[51] Int. Cl.³ .............................................. H04Q 3/00
[52] U.S. Cl. .................................. 370/58; 179/18 ES; 178/3
[58] Field of Search ....................... 370/58, 60, 110.1; 179/18 ES, 18 AD; 178/3

[56] References Cited

U.S. PATENT DOCUMENTS

| | | | |
|---|---|---|---|
| 4,245,339 | 1/1981 | Agricola et al. | 370/58 |
| 4,317,193 | 2/1982 | Joel | 370/58 |
| 4,345,326 | 8/1982 | Dieudonne et al. | 370/58 |
| 4,380,063 | 4/1983 | Janson et al. | 370/60 |

Primary Examiner—Douglas W. Olms
Attorney, Agent, or Firm—Karl F. Ross; Herbert Dubno

[57] ABSTRACT

A telecommunication system, e.g. a telephone switching exchange, comprises a multiplicity of substantially identical modular units each including a microprocessor controlling the emission of departing digital messages by a transmitting section and handling arriving digital messages reaching a receiving section. Each modular unit is connected to all other units by an outgoing and an incoming two-wire line each including a signaling wire and a response wire. The signaling wire of the outgoing line of a given modular unit emits, in the presence of a departing message in a memory of the associated transmitting section, a data-ready signal to the receiving section of the modular unit for which that message is destined; the latter section, continuously scanning the signaling wires of all incoming lines, then halts its scan and sends back an acknowledgement signal on the response wire of the same line whereupon the message is sent out on the aforementioned signaling wire. The message arriving at the receiving section of the unit of destination is temporarily stored in another memory before being fed to the associated microprocessor for further treatment as the scan is resumed.

3 Claims, 2 Drawing Figures

TELECOMMUNICATION SYSTEM WITH A MULTIPLICITY OF MODULAR UNITS INTERCHANGING DIGITAL MESSAGES

FIELD OF THE INVENTION

My present invention relates to a telecommunication system, e.g. a telephone switching exchange wherein a multiplicity of modular units exchange digital messages in an asynchronous manner by way of full-duplex signaling paths.

BACKGROUND OF THE INVENTION

In my commonly assigned copending application Ser. No. 403,706, filed July 30, 1982, there has been disclosed a telephone switching exchange consisting of a plurality of modular units where each modular unit comprises switching means and control means, the latter being formed by a microprocessor.

In known systems of this type, wherein a plurality of units each comprising a microprocessor exchange messages, one of these systems provides for equipping each microprocessor with a software structure adapted to cyclically interrogate the reception channels in order to detect whether one of the modular units in the system is providing a message destined therefor.

According to a further arrangement, the microprocessor of the modular unit ready to emit a message generates a request to interrupt the operative program of the microprocessor associated with the modular unit to which the message is addressed. Then, when the microprocessor of the receiving modular unit accedes to the interruption request, it recovers the message.

Such procedures for message transfer have the drawback that they require the engagement of at least one of the two microprocessors involved in the operation until it has completed the recovery of a message by the microprocessor of the receiving modular unit. Thus, the time spent by the microprocessors to transfer messages is substantial to the proportionate degree that it reduces their availability for performing other functions, such as processing operations etc.

OBJECT OF THE INVENTION

The object of the present invention is to provide a telecommunication system adapted to perform the exchange of messages in such a way as to minimize the engagement time of the two microprocessors involved in a message-exchange operation.

SUMMARY OF THE INVENTION

The telecommunication system according to the present invention is formed by a multiplicity of modular units connected with one another by means of communication channels or full-duplex signaling paths; each of these modular units comprises a microprocessor and these units exchange digital messages in an asynchronous manner.

The system of the invention provides, in each of the modular units, a transmitting section and a receiving section. The microprocessor controls the emission of a departing digital message by the transmitting section and handles digital messages reaching the receiving section.

The transmitting section of each modular unit is linked with the receiving section of each other modular unit of the system by a respective outgoing line, while the receiving section of each modular unit is linked with the transmitting section of each other modular unit of the system by an incoming line, this incoming line constituting the outgoing line of such other modular unit. Each of the lines includes a signaling wire and a response wire.

The transmitting section of each modular unit comprises a first memory means loadable by the associated microprocessor with departing messages including address bits designating the modular unit destined to receive the respective message, selection means connected to that first memory means for sending out a data-ready signal on the signaling wire of the outgoing wire leading to the designated modular unit, and switching means responsive to an acknowledgment signal on the response wire of the same line for replacing the data-ready signal by information bits stored in the first memory means as part of the message destined for the designated modular unit.

The receiving section of each modular unit comprises scanning means for continuously exploring the signaling wires of all incoming lines in order to detect the presence of a data-ready signal thereon, signal-generating means connectable by the scanning means to the response wire of each incoming line whose signaling wire is being explored to emit the acknowledgment signal thereover upon detection of a data-ready signal, with temporary halting of the exploration of the signaling wires by the scanning means in response thereto, and a second memory means connectable by the scanning means to the momentarily explored signaling wire for temporarily storing information bits arriving thereover during that temporary halt preparatorily to delivering the information bits to the associated microprocessor.

Thus, in accordance with the present invention, after having transferred a message to the transmitting section associated therewith, the microprocessor of the emitting modular unit is able to perform other operations without having to wait for completion of delivery of the message to the receiving modular unit.

Similarly, the microprocessor of the receiving modular unit is engaged only for the recovery time of the message, considering that the message is recovered, i.e. delivered, when it is already inside the receiving modular unit.

BRIEF DESCRIPTION OF THE DRAWING

The above and other objects, features and advantages of the present invention will now be described in greater detail, reference being made to the accompanying drawing in which.

SPECIFIC DESCRIPTION

Figure 1:
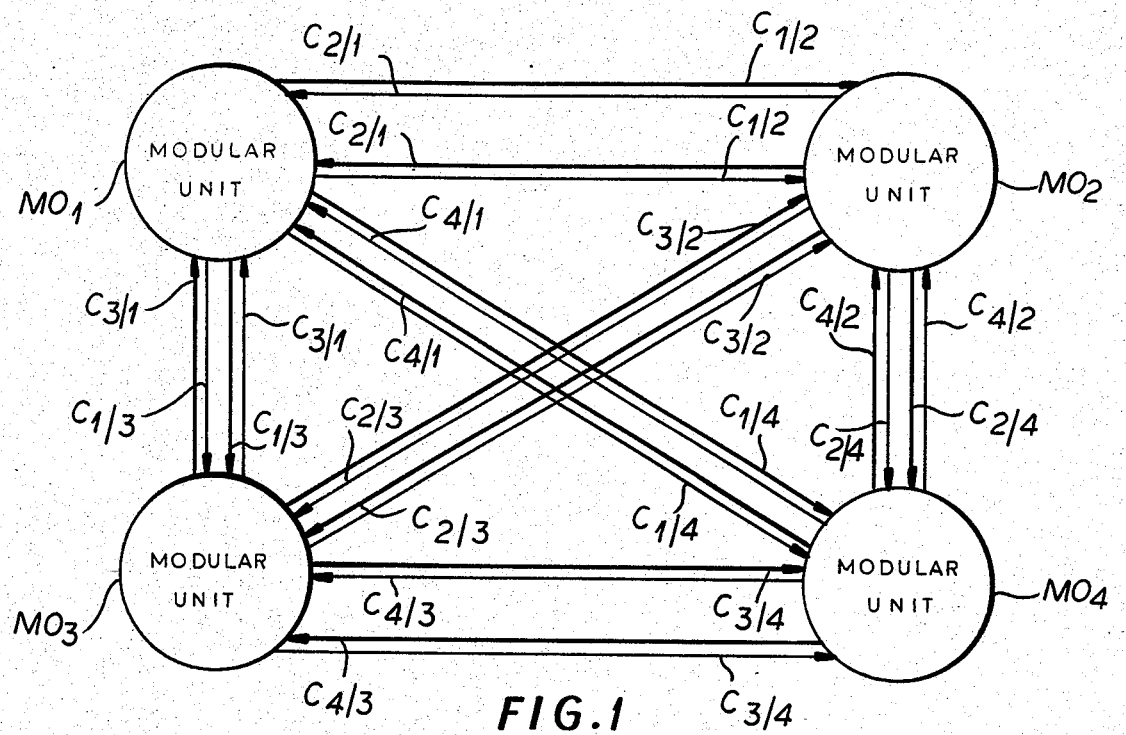
FIG. 1 shows diagrammatically a telecommunication system according to the invention, consisting of a plurality of modular units connected with one another by full-duplex signaling paths.

As shown in FIG. 1, modular units $MO_1 \ldots MO_4$ form a telecommunication system such as a telephone switching exchange of modular type. Modules MO are interconnected via full-duplex paths by means of a communication channel C for each transmission path. In this Figure the communication channels are represented by marked lines designated by paired numbers which respectively indicate the transmitting modular unit and the receiving modular unit.

Moreover, each modular unit MO includes a connection to each of the remaining modular units forming a signal path associated with a respective transmission channel C through which the receiving modular unit supplies the transmitting modular unit with an activation control for the emission of the message on the associated channel C.

In the assumption that modular unit $MO_1$ is to send a message to modular unit $MO_4$, modular unit $MO_1$ applies a data-ready signal of prefixed polarity level on wire $C_4^1$; modular unit $MO_4$, which cyclically scans channels $C_4^1$, $C_{2/4}$ and $C_4^3$ and when during such scanning it detects the presence of that data-ready signal, it stops scanning, remains connected to channel $C_4^1$ and supplies modular unit $MO_1$ with an activation or acknowledgment signal for the transmission of the message by way of channel $C_4^1$. In response to the reception of that activation signal, modular unit $MO_1$ emits the message on channel $C_4^1$, thus enabling recovery of the message by module $MO_4$.

The exchange of messages as described above occurs in an asynchronous manner and the engagement time of the microprocessors of the pair of modular units involved in the message transfer is reduced to a minimum, as explained hereinafter in the description of the circuitry of a given modular unit MO with reference to FIG. 2.

Figure 2:
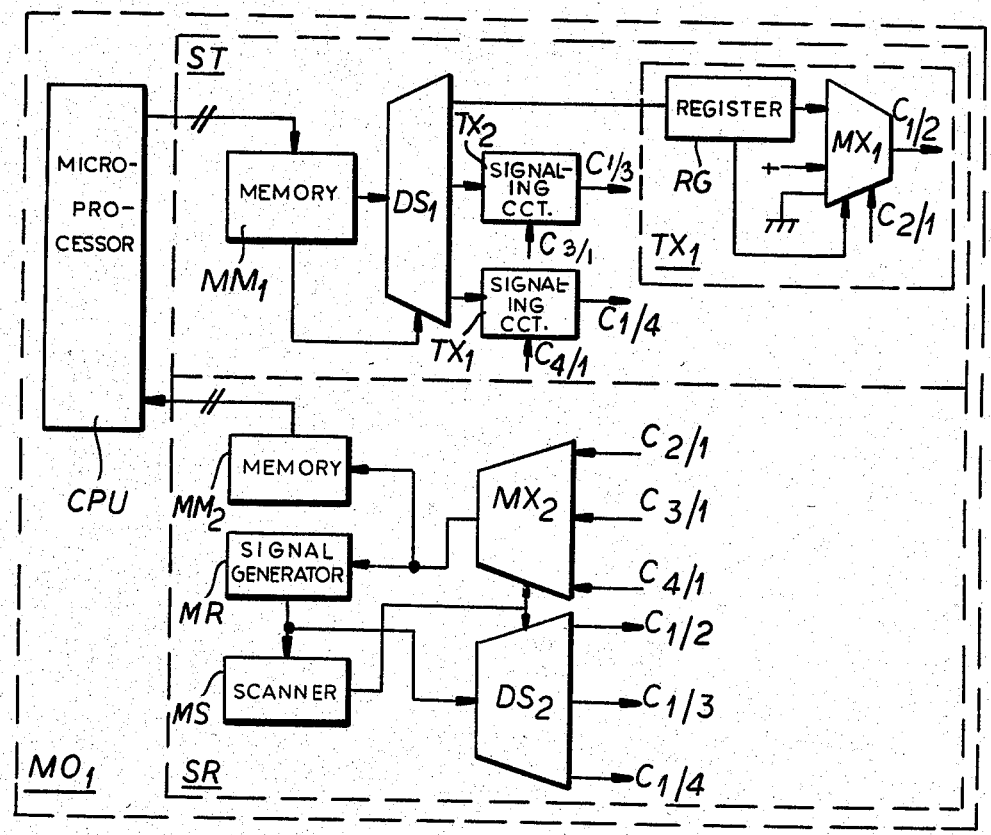
FIG. 2 shows, diagrammatically, the circuits of one of the modular units of FIG. 1.

FIG. 2 shows the circuital arrangement realized according to the invention as represented by each of the modular units. In this Figure, CPU designates the microprocessor forming the control unit of the modular unit which is designed to exchange messages with units CPU of the remaining modular units.

In the case where the modular units form a telephone switching exchange, the aforesaid messages comprise for example the data relating to the establishment or control of a telephone connection.

Unit CPU is connected to the circuital arrangement according to the invention, which comprises a transmitting section ST and a receiving section SR.

The transmitting section includes storage or memory means $MM_1$ into which unit CPU transfers in parallel the information bits of a given message which mainly comprises a first field of bits relative to the information bits and a second field of bits containing the address of the receiving modular unit.

The address bits of the second field are applied to the control input of a signal distributor $DS_1$ which, assuming that the system is formed by four modular units (FIG. 1), provides for the presence of three outputs which are associated with channels $C_4^1$, $C_4^2$ and $C_4^3$ to all the other modular units. Thus, unit $DS_1$ serially distributes the message stored in memory means $MM_1$ to one of the transmission units TX connected therewith. FIG. 2 shows only unit $TX_1$ in detail, this unit including a register RG designed to activate one of its outputs in response to the reception of a message and the said output is connected to the control input of a multiplexer $MX_1$.

Multiplexer $MX_1$ has a first data input connected to the data output of register RG, a second data input which is applied to a prefixed polarity (e.g. +5V) and a third data input connected to ground.

When register RG has no messages at its disposal, unit $MX_1$ applies the ground potential to the respective wire C, while the reception of a message by register RG, destined for example to modular unit $MO_2$, determines the activation of said output and consequently a modification in the address bits of multiplexer $MX_1$ which informs modular unit $MO_2$ of the presence of a message therefor by applying the said potential on wire $C_4^1$.

Wires C reach the input of a multiplexer $MX_2$ contained in the receiving section SR of each modular unit. The control input of multiplexer $MX_2$ receives the outputs of the scanning means MS arranged to establish the cyclic connection of wires C with signal-generating means MR adapted to detect the presence of the aforementioned polarity as well as to emit a stop signal of the scanner MS when the detection yields a positive result.

The signal generated by units MR is also applied to the input of a signal distributor $DS_2$ which is also addressed by the outputs of the scanner MS.

Unit $DS_2$ is applied to the wires C so that, in the assumption that modular unit $MO_4$ has indicated the presence of a message destined to modular unit $MO_1$, unit MR stops the scanning when channel $C_{4/1}$ is addressed and unit $DS_2$ sends the activation signal on wire $C_4^1$ thus enabling modular unit $MO_4$ to transmit the message.

The message reaches modular unit $MO_1$ through channel $C_{4/1}$ and is sent to the input of the storage means $MM_2$ by way of multiplexer $MX_2$. It is then transferred in parallel to unit CPU.

From the foregoing description it will be clear that the engagement time of the two microprocessors involved in the transfer of a message is reduced to the minimum, since the transfer is mainly dealt with by the circuital arrangement according to the invention, particularly by the transmitting section of the emitting modular unit and by the receiving section of the modular unit of destination.

I claim:

1. In a telecommunication system, in combination, a multiplicity of message-exchanging modular units each comprising a transmitting section, a receiving section, and a microprocessor controlling the emission of a departing digital message by said transmitting section and handling arriving digital messages reaching said receiving section, the transmitting section of each modular unit being linked with the receiving section of each other modular unit of the system by a respective outgoing line, the receiving section of each modular unit being linked with the transmitting section of each other modular unit of the system by an incoming line constituting the outgoing line of such other modular unit, each of said lines including a signaling wire and a response wire;

the transmitting section of each modular unit comprising first memory means loadable by the associated microprocessor with departing messages including address bits designating the modular unit destined to receive the respective message, selection means connected to said first memory means for sending out a data-ready signal on the signaling wire of the outgoing wire leading to the designated modular unit, and switching means responsive to an acknowledgement signal on the response wire of the same line for replacing said data-ready signal by information bits stored in said first memory means as part of the message destined for the designated modular unit;

the receiving section of each modular unit comprising scanning means for continuously exploring the signaling wires of all incoming lines to detect the presence of a data-ready signal thereon, signal-generating means connectable by said scanning means to the response wire of each incoming line whose signaling wire is being explored to emit said acknowledgment signal thereover upon detection of said data-ready signal, with temporary halting of the exploration of said signaling wires by said scanning means in response thereto, and second memory means connectable by said scanning means to the momentarily explored signaling wire for temporarily storing information bits arriving thereover during the temporary halt of said exploration preparatorily to delivering said information bits to the associated microprocessor.

2. The combination defined in claim 1 wherein said selection means comprises a first demultiplexer provided with a number of outputs respectively assigned to all other modular units of the system, said first demultiplexer being controlled by the address bits stored in said first memory means for connecting an information-bit output thereof to the output assigned to the designated modular unit, each of said outputs extending to a respective signaling circuit including a register loadable with the information bits of a departing message read out from said first memory means, said switching means comprising a first multiplexer in each signaling circuit settable by the presence of information bits in said register for sending out said data-ready signal over the respective signaling wire and further settable by the arrival of said acknowledgment signal for reading out the contents of said register to the respective signaling wire; said receiving section further comprising a second multiplexer and a second demultiplexer jointly settable by said scanning means for concurrently connecting an input of said signal-generating means in parallel with said second memory means to the explored signaling wire and an output of said signal-generating means to the corresponding response wire, said scanning means having a control input connected to the output of said signal-generating means for receiving a halting command therefrom upon detection of a data-ready signal.

3. The combination defined in claim 2 wherein said first multiplexer normally grounds the respective signaling wire, said data-ready signal being a potential of predetermined polarity applied from a source thereof to the respective signaling wire by said first multiplexer.

* * * * *